(12) United States Patent
Zhou et al.

(10) Patent No.: US 12,167,429 B2
(45) Date of Patent: Dec. 10, 2024

(54) BANDWIDTH PART SWITCHING DELAY FOR UPLINK TRANSMISSION

(71) Applicant: Apple Inc., Cupertino, CA (US)

(72) Inventors: Yuhan Zhou, Santa Clara, CA (US); Jie Cui, Santa Clara, CA (US); Yang Tang, Santa Clara, CA (US); Hua Li, Beijing (CN); Rui Huang, Beijing (CN)

(73) Assignee: Apple Inc., Cupertino, CA (US)

( * ) Notice: Subject to any disclaimer, the term of this patent is extended or adjusted under 35 U.S.C. 154(b) by 970 days.

(21) Appl. No.: 17/250,652

(22) PCT Filed: Aug. 19, 2019

(86) PCT No.: PCT/US2019/047036
§ 371 (c)(1),
(2) Date: Feb. 16, 2021

(87) PCT Pub. No.: WO2020/041182
PCT Pub. Date: Feb. 27, 2020

(65) Prior Publication Data
US 2021/0243766 A1 Aug. 5, 2021

Related U.S. Application Data

(60) Provisional application No. 62/720,031, filed on Aug. 20, 2018.

(51) Int. Cl.
*H04W 72/04* (2023.01)
*H04W 56/00* (2009.01)
(Continued)

(52) U.S. Cl.
CPC ....... *H04W 72/53* (2023.01); *H04W 56/0045* (2013.01); *H04W 72/0446* (2013.01); *H04W 72/0453* (2013.01); *H04W 72/23* (2023.01)

(58) Field of Classification Search
CPC . H04W 28/06; H04W 72/23; H04W 72/0453; H04W 72/1263; H04W 72/0446;
(Continued)

(56) References Cited

U.S. PATENT DOCUMENTS 10,721,765 B2 * 7/2020 Park ................. H04W 72/0453
10,805,872 B2 * 10/2020 Yi ........................ H04L 5/0035
(Continued)

FOREIGN PATENT DOCUMENTS

CN 108012329 A 5/2018
WO 2018/144873 8/2018

OTHER PUBLICATIONS

Mediatek Inc., "BWP Switching Delay", R4-1810021, 3GPP TSG-RAN WG4, Aug. 2018.
(Continued)

*Primary Examiner* — Jung Liu
(74) *Attorney, Agent, or Firm* — Fay Kaplun & Marcin, LLP

(57) ABSTRACT

An apparatus of a user equipment (UE) comprises one or more baseband processors to process a bandwidth part (BWP) switching request from a serving cell at slot n, and to perform an active BWP switch to a new BWP on the serving cell at a time no later than slot n+Y, wherein Y is a BWP switching delay. The one or more baseband processors are to accommodate a timing advance (TA) value to determine when to perform the active BWP switch. The apparatus can include a memory to store the BWP switching request.

14 Claims, 4 Drawing Sheets

(51) Int. Cl.
*H04W 72/0446* (2023.01)
*H04W 72/0453* (2023.01)
*H04W 72/23* (2023.01)
*H04W 72/53* (2023.01)

(58) Field of Classification Search
CPC . H04W 36/06; H04W 72/53; H04W 56/0045; H04L 5/0053; H04L 5/0096; H04L 5/0098
See application file for complete search history.

(56) References Cited

U.S. PATENT DOCUMENTS

| | | | | |
|---|---|---|---|---|
| 10,819,655 | B2* | 10/2020 | Ang | H04W 72/0453 |
| 10,917,892 | B2* | 2/2021 | Yang | H04W 72/0453 |
| 10,945,277 | B2* | 3/2021 | Abdoli | H04W 36/06 |
| 10,993,254 | B2* | 4/2021 | Ang | H04W 72/0446 |
| 11,006,442 | B2* | 5/2021 | Salah | H04L 5/0091 |
| 11,018,825 | B2* | 5/2021 | Hwang | H04L 5/0053 |
| 11,804,933 | B2* | 10/2023 | Hwang | H04L 5/0051 |
| 2014/0254452 | A1 | 9/2014 | Elbwart et al. | |
| 2019/0104543 | A1* | 4/2019 | Park | H04W 74/006 |
| 2019/0132845 | A1* | 5/2019 | Babaei | H04L 1/1812 |
| 2019/0149305 | A1* | 5/2019 | Zhou | H04L 5/0092 370/330 |
| 2019/0166066 | A1* | 5/2019 | Ang | H04W 72/23 |
| 2019/0215847 | A1* | 7/2019 | Abdoli | H04W 72/0453 |
| 2019/0254056 | A1* | 8/2019 | Salah | H04W 72/1263 |
| 2019/0261405 | A1* | 8/2019 | Ang | H04W 28/06 |
| 2019/0312635 | A1* | 10/2019 | Ang | H04L 5/0098 |
| 2019/0313410 | A1* | 10/2019 | Yang | H04W 72/0453 |
| 2019/0349815 | A1* | 11/2019 | Tiirola | H04W 72/12 |
| 2019/0349963 | A1* | 11/2019 | Abdoli | H04W 72/1263 |
| 2020/0221508 | A1 | 7/2020 | Huang et al. | |
| 2020/0266950 | A1* | 8/2020 | Hwang | H04W 72/23 |
| 2020/0351837 | A1* | 11/2020 | Hwang | H04L 1/1812 |
| 2021/0211256 | A1* | 7/2021 | Hwang | H04W 72/23 |
| 2021/0243766 | A1* | 8/2021 | Zhou | H04W 36/06 |
| 2022/0294595 | A1* | 9/2022 | Jeon | H04B 7/0626 |

OTHER PUBLICATIONS

3GPP TS 38.213 V15.2.0, "3GPP; TSGRAN; NR; Physical Layer Procedures for Control (Release 15)", Jun. 2018.
Mediatek Inc., "Remaining Details on UL/DL Resource Allocation", R1-1801681, 3GPP TSG RAN WG1, Feb. 2018.
ITRI, "Latency Due to Bandwidth Part Switching", R1-1809183, 3GPP TSG-RAN WG1, Aug. 2018.
Mediatek Inc., "Remaining Issues on Bandwidth Part and Carrier Aggregation in NR", 3GPP, R1-1808270, 8 sheets, Aug. 11, 2018.
NTT Docomo et al. "RAN WG's Progress on NR WI in the February Meeting 2018", 3GPP, R2-1804394, 86 sheets, Apr. 6, 2018.
Qualcomm Incorporated, "Summary of Remaining Details on RACH Procedure", 3GPP, R1-1805650, 26 sheets, Apr. 18, 2018.
ZTE Corporation, "Consideration on the autonomous BWP switch", 3GPP TSG-RAN WG2 Meeting #100, R2-1712433, Nov. 16, 2017, 5 sheets.
MediaTek Inc., "Summary of Bandwidth Part Remaining Issues", GPP TSG RAN WG1 Meeting #92bis, R1-1807801, May 25, 2018, 25 sheets.
Zhang Lingfeng, "Research and Implementation of Channel Detection and Estimation for LPLC and Its Adaptive Rate Transmission", China excellent master's dissertation, https://www.cnki.net, Dec. 15, 2016.

* cited by examiner

BANDWIDTH PART SWITCHING DELAY FOR UPLINK TRANSMISSION

CROSS-REFERENCE TO RELATED APPLICATIONS

The present application claims the benefit of U.S. Provisional Application No. 62/720,031 filed Aug. 20, 2019. Said Application No. 62/720,031 is hereby incorporated herein by reference in its entirety.

BACKGROUND

The downlink control information (DCI) based or timer-based bandwidth part (BWP) switching requirement defined in Third Generation Partnership Project (3GPP) Technical Standard (TS) 38.133 for the uplink (UL) does not consider the effect from timing advance (TA), which is not precise. From the perspective of the user equipment (UE), the delay due to BWP switching is an absolute number and it is the same for the uplink (UL) and the downlink (DL). It is noted, however, that the timings of UL and DL differ by the value of TA. As a result, the delay requirement specified in R4-1809380, a newer version of 3GPP TS 38.133, cannot be satisfied by the UE.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
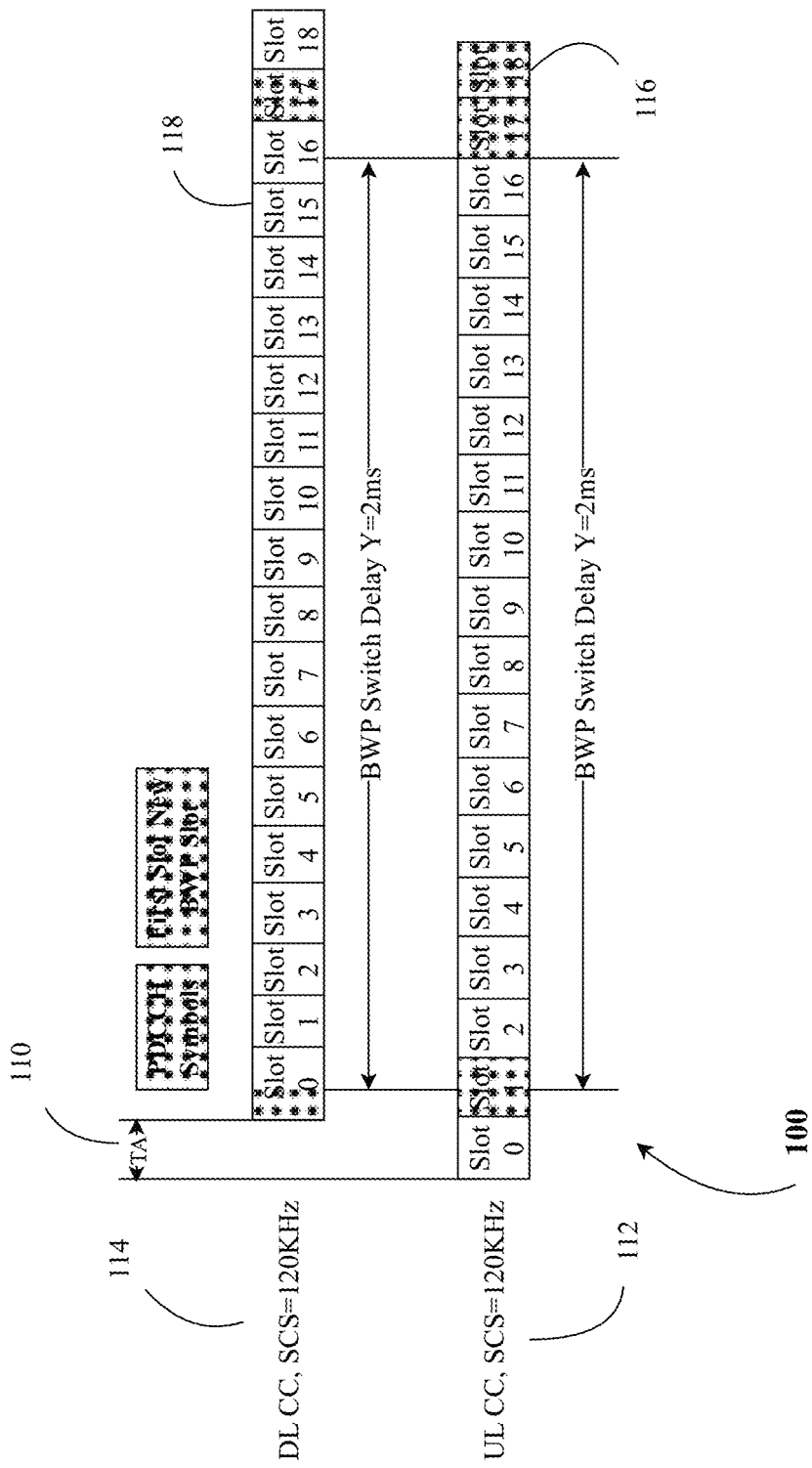
FIG. 1 is a diagram of illustrating the starting time and ending time for downlink control information (DCI) based bandwidth part (BW)P switching in the uplink in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now FIG. 1, a diagram of illustrating the starting time and ending time for downlink control information (DCI) based bandwidth part (BWP) switching in the uplink in accordance with one or more embodiments will be discussed. The bandwidth part (BWP) switching delay requirement for uplink (UL) transmission as defined in Third Generation Partnership Project (3GPP) Technical Standard (TS) 3 8.133 can be modified to take timing advance (TA) into account. An example TA 110 is shown in diagram 100 of FIG. 1. The latest version, R4-1809380, of TS 38.133 states the following.

For DCI-based BWP switch, after the UE receives BWP switching request at slot n on a serving cell, UE shall be able to receive PDSCH (for DL active BWP switch) or transmit PUSCH (for UL active BWP switch) on the new BWP on the serving cell on which BWP switch occurs no later than at slot n+Y.

For timer-based BWP switch, the UE shall start BWP switch at slot n, where n is the beginning of a subframe (FR1) or half-subframe (FR2) immediately after a BWP-inactivity timer expires on a serving cell, and the UE shall be able to receive PDSCH (for DL active BWP switch) or transmit PUSCH (for UL active BWP switch) on the new BWP on the serving cell on which BWP switch occurs no later than at slot n+Y.

Since the above passages from TS 38.133 do not take the effect of timing advance (TA) 110 into account in the UL 112. From the perspective of the UE, the delay due to BWP switching is an absolute number and it is the same for the UL 112 and the downlink (DL) 114, and the timings of the UL 112 and the DL 114 differ by the value of TA 110 as shown in FIG. 1. As a result, the delay requirement specified in version R4-1809380 of TS 38.133) cannot be satisfied by the UE.

In one example, the timing advance (TA) 110 can be taken into account as follows. For a downlink control information (DCI) based BWP switch in the UL 110, the UE can start the BWP switch at slot m, where the timing of the end of last orthogonal frequency-division multiplexing (OFDM) symbol of the physical downlink control channel (PDCCH) carrying the active BWP switch DCI in the DL 114 is within slot m. If the end of last OFDM symbol of the PDCCH carrying the active BWP switch DCI in the DL 114 is exactly aligned with the boundary between slot m and slot m+1, the UE can start BWP switch at slot m+1. The UE can transmit the physical uplink shared channel (PUSCH) for the UL 112 active BWP switch on the new BWP on the serving cell on which BWP switch occurs no later than at slot m+Y, where Y represents a BWP switch delay of Y=2 milliseconds (ms).

In another example, the timing advance (TA) 110 can be taken into account as follows. For timer-based BWP switch in the UL 112, the UE can start the BWP switch at UL slot m, where m is the beginning of a subframe (FR1) or half-subframe (FR2) immediately after a BWP-inactivity timer expires on the serving cell, and the UE can transmit the PUSCH for the UL 112 active BWP switch on the new BWP on the serving cell on which BWP switch occurs no later than at slot m+Y, where Y represents a BWP switch delay of Y=2 ms.

The diagram 100 of FIG. 1 illustrates the starting and ending time for UL DCI-based BWP switching in the carrier with 120 kHz subcarrier spacing (SCS). As shown in FIG. 1, the BWP switching starts in Slot 0 in the DL 114 but starts in Slot 1 in the UL 112. With the same delay duration for BWP switching in the DL 114 and the UL 112, the UL 112 can receive PDSHC on the new BWP on the serving cell at Slot 17 in the UL 112, and can transmit the PUSCH on the new BWP on the serving cell at Slot 18 in the UL 112. The one slot difference between the UL 112 and the DL 114 is due to the presence of the timing advance (TA) 110. As a result, the first new BWP slot for the UL 112 is Slot 18, shown in FIG. 1 as slot 116. The first new BWP slot for the DL 114 is Slot 17, shown in FIG. 1 as slot 118.

In some examples, if the starting time of BWP switching in both the DL 114 and the UL 112 is all based on DL slot n, the delay duration for the DL 114 and the UL 112 can be different. The relationship between the two delay durations for the DL 114 and the UL 112 BWP switching can be as follows. If the UE starts a BWP switch at slot n for the DL 114, then the UE can receive the PDSCH for the DL 114 active BWP switch on the new BWP on the serving cell on which the BWP switch occurs no later than at slot n+Y, where Y represents a BWP switch delay of Y=2 ms. Alternatively, the UE can transmit the PUSCH for the UL 112 active BWP switch on the new BWP on the serving cell on which BWP switch occurs no later than at slot n+X, where X=Ceil(Y+TA) in the unit of slot and where the function Ceil(•) is the ceiling function.

Figure 2:
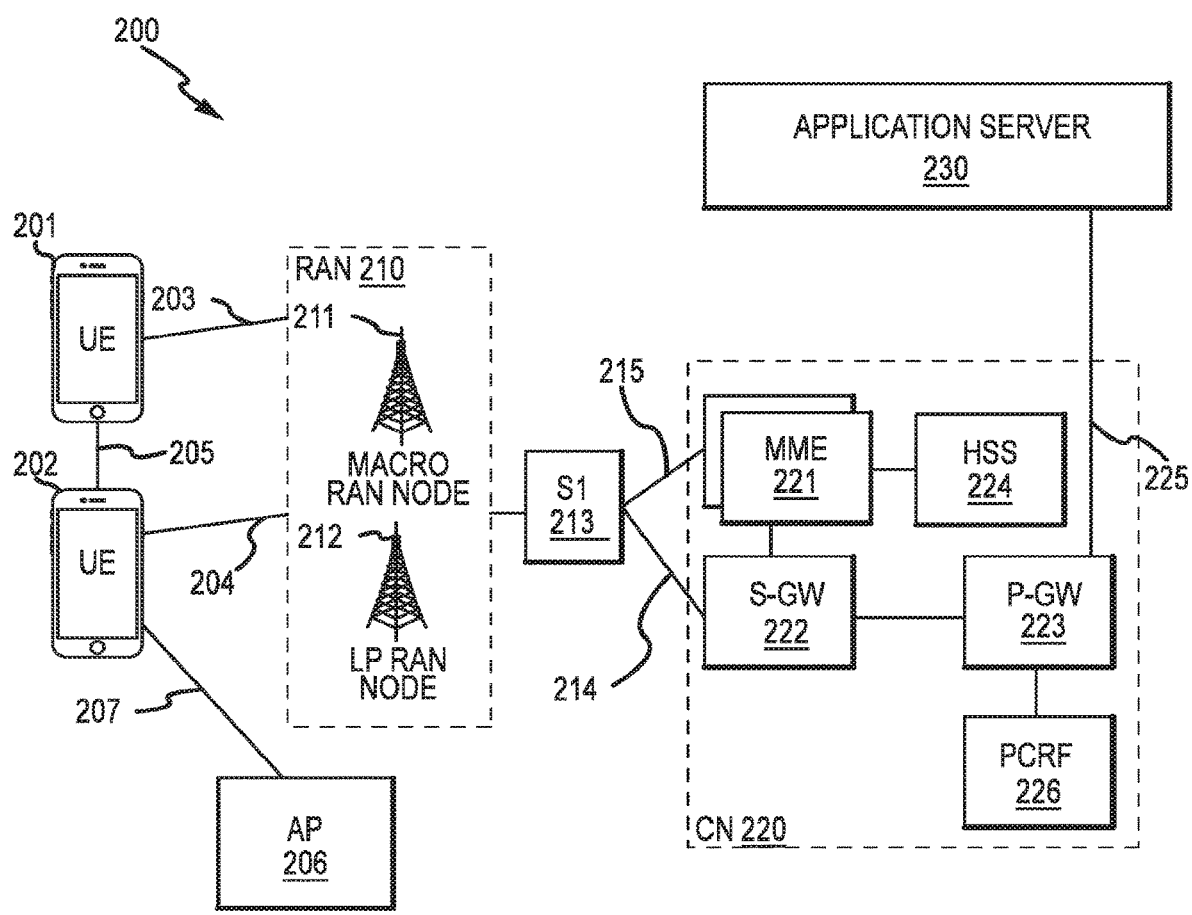
FIG. 2 illustrates an architecture of a system of a network in accordance with some embodiments.

FIG. 2 illustrates an architecture of a system 200 of a network in accordance with some embodiments. The system 200 is shown to include a user equipment (UE) 201 and a UE 202. The UEs 201 and 202 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 201 and 202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 201 and 202 may be configured to connect, e.g., communicatively couple, with a radio access network (RAN) 210—the RAN 210 may be, for example, an Evolved Universal Mobile Telecommunications System (UMTS) Terrestrial Radio Access Network (E-UTRAN), a NextGen RAN (NG RAN), or some other type of RAN. The UEs 201 and 202 utilize connections 203 and 204, respectively, each of which comprises a physical communications interface or layer (discussed in further detail below); in this example, the connections 203 and 204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 201 and 202 may further directly exchange communication data via a ProSe interface 205. The ProSe interface 205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 202 is shown to be configured to access an access point (AP) 206 via connection 207. The connection 207 can comprise a local wireless connection, such as a connection consistent with any IEEE 802.11 protocol, wherein the AP 206 would comprise a wireless fidelity (WiFi®) router. In this example, the AP 206 is shown to be connected to the Internet without connecting to the core network of the wireless system (described in further detail below).

The RAN 210 can include one or more access nodes that enable the connections 203 and 204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 210 may include one or more RAN nodes for providing macrocells, e.g., macro RAN node 211, and one or more RAN nodes for providing femtocells or picocells (e.g., cells having smaller coverage areas, smaller user capacity, or higher bandwidth compared to macrocells), e.g., low power (LP) RAN node 212.

Any of the RAN nodes 211 and 212 can terminate the air interface protocol and can be the first point of contact for the UEs 201 and 202. In some embodiments, any of the RAN nodes 211 and 212 can fulfill various logical functions for the RAN 210 including, but not limited to, radio network controller (RNC) functions such as radio bearer management, uplink and downlink dynamic radio resource management and data packet scheduling, and mobility management.

In accordance with some embodiments, the UEs 201 and 202 can be configured to communicate using Orthogonal Frequency-Division Multiplexing (OFDM) communication signals with each other or with any of the RAN nodes 211 and 212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 and 212 to the UEs 201 and 202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 201 and 202. The physical downlink control channel (PDCCH) may carry information about the transport format and resource allocations related to the PDSCH channel, among other things. It may also inform the UEs 201 and 202 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 211 and 212 based on channel quality information fed back from any of the UEs 201 and 202. The downlink resource assignment information may be sent on the PDCCH used for (e.g., assigned to) each of the UEs 201 and 202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 210 is shown to be communicatively coupled to a core network (CN) 220—via an S1 interface 213. In embodiments, the CN 220 may be an evolved packet core (EPC) network, a NextGen Packet Core (NPC) network, or some other type of CN. In this embodiment the S1 interface 213 is split into two parts: the S1-U interface 214, which carries traffic data between the RAN nodes 211 and 212 and the serving gateway (S-GW) 222, and the S1-mobility management entity (MME) interface 215, which is a signaling interface between the RAN nodes 211 and 212 and MMEs 221.

In this embodiment, the CN 220 comprises the MMEs 221, the S-GW 222, the Packet Data Network (PDN) Gateway (P-GW) 223, and a home subscriber server (HSS) 224. The MMEs 221 may be similar in function to the control plane of legacy Serving General Packet Radio Service (GPRS) Support Nodes (SGSN). The MMEs 221 may manage mobility aspects in access such as gateway selection and tracking area list management. The HSS 224 may comprise a database for network users, including subscription-related information to support the network entities' handling of communication sessions. The CN 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc.

The S-GW 222 may terminate the S1 interface 213 towards the RAN 210, and routes data packets between the RAN 210 and the CN 220. In addition, the S-GW 222 may be a local mobility anchor point for inter-RAN node handovers and also may provide an anchor for inter-3GPP mobility. Other responsibilities may include lawful intercept, charging, and some policy enforcement.

The P-GW 223 may terminate an SGi interface toward a PDN. The P-GW 223 may route data packets between the EPC network 223 and external networks such as a network including the application server 230 (alternatively referred to as application function (AF)) via an Internet Protocol (IP) interface 225. Generally, the application server 230 may be an element offering applications that use IP bearer resources with the core network (e.g., UMTS Packet Services (PS) domain, LTE PS data services, etc.). In this embodiment, the P-GW 223 is shown to be communicatively coupled to an application server 230 via an IP communications interface 225. The application server 230 can also be configured to support one or more communication services (e.g., Voice-over-Internet Protocol (VoIP) sessions, PTT sessions, group communication sessions, social networking services, etc.) for the UEs 201 and 202 via the CN 220.

The P-GW 223 may further be a node for policy enforcement and charging data collection. Policy and Charging Enforcement Function (PCRF) 226 is the policy and charging control element of the CN 220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate Quality of Service (QoS) and charging parameters. The PCRF 226 may provision this rule into a Policy and Charging Enforcement Function (PCEF) (not shown) with the appropriate traffic flow template (TFT) and QoS class of identifier (QCI), which commences the QoS and charging as specified by the application server 230.

Figure 3:
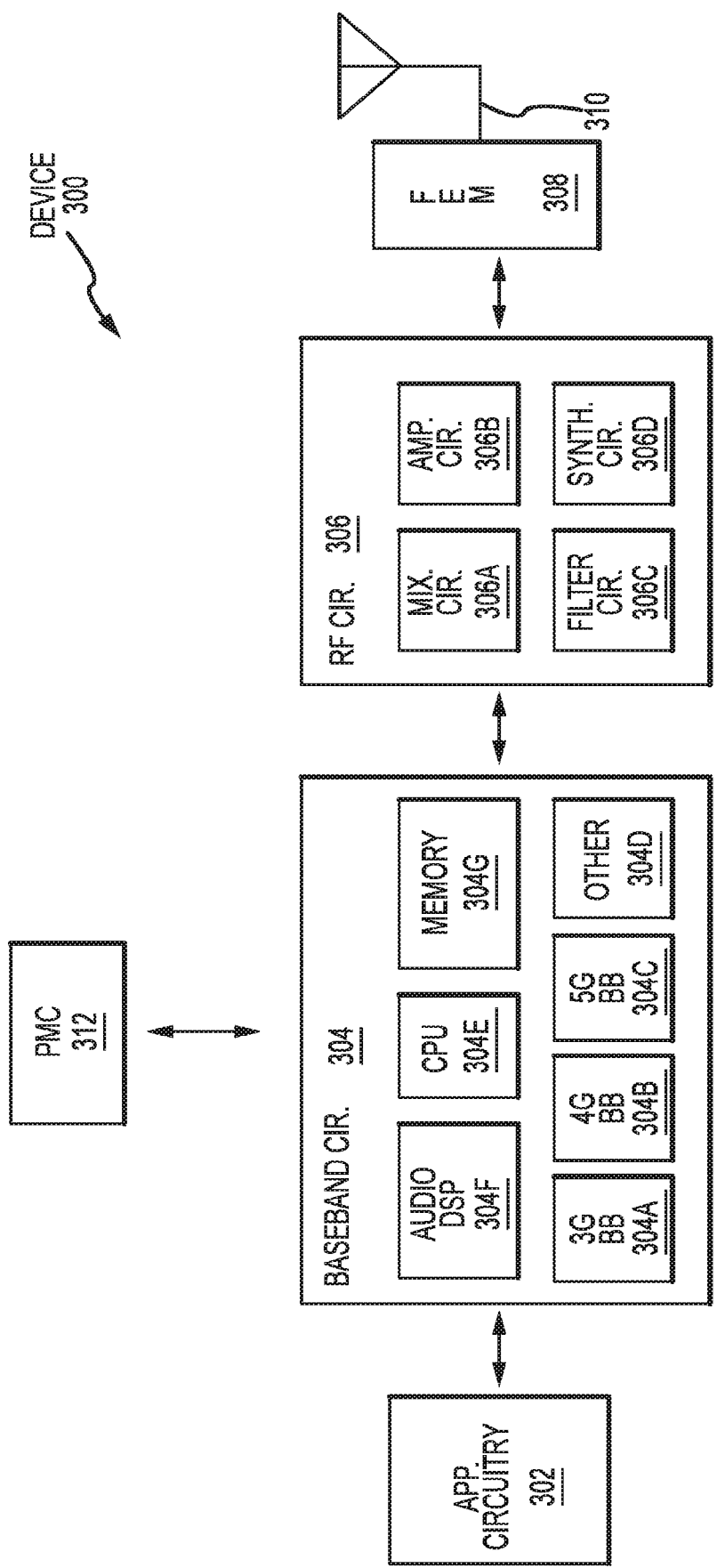
FIG. 3 illustrates example components of a device in accordance with some embodiments.

FIG. 3 illustrates example components of a device 300 in accordance with some embodiments. In some embodiments, the device 300 may include application circuitry 302, baseband circuitry 304, Radio Frequency (RF) circuitry 306, front-end module (FEM) circuitry 308, one or more antennas 310, and power management circuitry (PMC) 312 coupled together at least as shown. The components of the illustrated device 300 may be included in a UE or a RAN node. In some embodiments, the device 300 may include less elements (e.g., a RAN node may not utilize application circuitry 302, and instead include a processor/controller to process IP data received from an EPC). In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or to be developed in the future (e.g., second generation (2G), sixth generation (6G), etc.). The baseband circuitry 304 (e.g., one or more of baseband processors 304A-D) may handle various radio control functions that enable communication with one or more radio networks via the RF circuitry 306. In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), precoding, or constellation mapping/demapping functionality. In some embodiments, encoding/decoding circuitry of the baseband circuitry 304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include one or more audio digital signal processor(s) (DSP) 304F. The audio DSP(s) 304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the receive signal path of the RF circuitry 306 may include mixer circuitry 306a, amplifier circuitry 306b and filter circuitry 306c. In some embodiments, the transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c.

In some embodiments, the mixer circuitry 306a of the receive signal path and the mixer circuitry 306a of the transmit signal path may include two or more mixers and may be arranged for quadrature downconversion and upconversion, respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a may be arranged for direct downconversion and direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect. In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage-controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM 308, or in both the RF circuitry 306 and the FEM 308.

In some embodiments, the FEM circuitry 308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device is included in a UE. The PMC 312 may increase the power conversion efficiency while providing desirable implementation size and heat dissipation characteristics.

While FIG. 3 shows the PMC 312 coupled only with the baseband circuitry 304. However, in other embodiments, the PMC 3 12 may be additionally or alternatively coupled with, and perform similar power management operations for, other components such as, but not limited to, application circuitry 302, RF circuitry 306, or FEM 308.

In some embodiments, the PMC 312 may control, or otherwise be part of, various power saving mechanisms of the device 300. For example, if the device 300 is in an RRC_Connected state, where it is still connected to the RAN node as it expects to receive traffic shortly, then it may enter a state known as Discontinuous Reception Mode (DRX)

after a period of inactivity. During this state, the device 300 may power down for brief intervals of time and thus save power.

If there is no data traffic activity for an extended period of time, then the device 300 may transition off to an RRC_Idle state, where it disconnects from the network and does not perform operations such as channel quality feedback, handover, etc. The device 300 goes into a very low power state and it performs paging where again it periodically wakes up to listen to the network and then powers down again. The device 300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 302 and processors of the baseband circuitry 304 may be used to execute elements of one or more instances of a protocol stack. For example, processors of the baseband circuitry 304, alone or in combination, may be used execute Layer 3, Layer 2, or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 4:
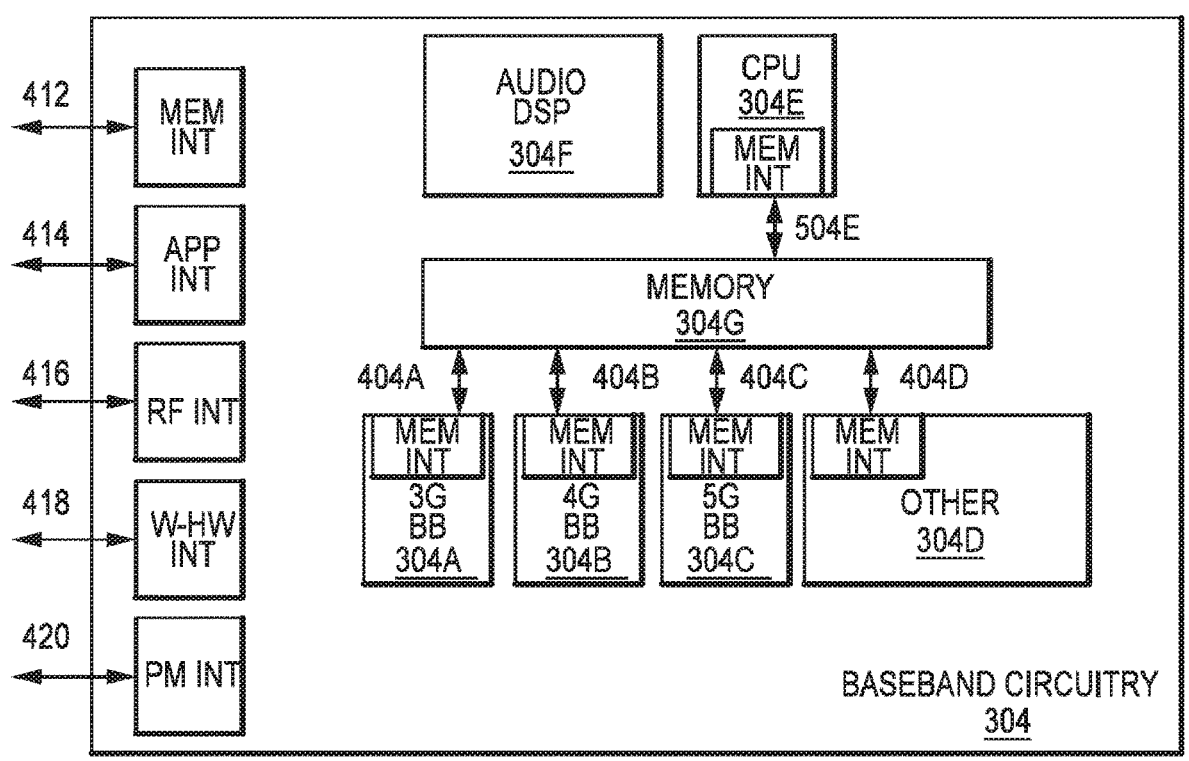
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NFC) components, Bluetooth® components (e.g., Bluetooth® Low Energy), Wi-Fi® components, and other communication components), and a power management interface 420 (e.g., an interface to send/receive power or control signals to/from the PMC 312.

The following are example implementations of the subject matter described herein. In example one, an apparatus of a user equipment (UE) comprises one or more baseband processors to process a bandwidth part (BWP) switching request from a serving cell at slot n, and to perform an active BWP switch to a new BWP on the serving cell at a time no later than slot n+Y, wherein Y is a BWP switching delay, wherein the one or more baseband processors are to accommodate a timing advance (TA) value to determine when to perform the active BWP switch, and a memory to store the BWP switching request. Example two can include the subject matter of example one or any of the examples described herein, wherein the one or more baseband processors are to receive a physical downlink shared channel (PDSCH) for the downlink (DL) at a slot offset in time by the TA value with respect to the uplink (UL). Example three can include the subject matter of example one or any of the examples described herein, wherein the one or more baseband process are to transmit a physical uplink shared channel (PUSCH) for the uplink (UL) at a slot advanced in time by the TA value with respect to the downlink (DL).

In example four, an apparatus of a user equipment (UE) comprises one or more baseband processors to process a bandwidth part (BWP) switching request from a serving cell at slot m, and to perform an active BWP switch to transmit a physical uplink shared channel (PUSCH) in the uplink (UL) on a new BWP on the serving cell at a time no later than slot m+Y, wherein Y is a BWP switching delay, wherein downlink slots are offset by a timing advance (TA) value with respect to UL slots, and the one or more baseband processors are to accommodate the TA value to determine when to perform the active BWP switch, and a memory to store the BWP switching request. Example five can include the subject matter of example four or any of the examples described herein, wherein an end of a last symbol of a physical downlink control channel (PDCCH) carrying the active BWP switch downlink control information (DCI) in the DL is within slot m. Example six can include the subject matter of example four or any of the examples described herein, wherein the one or more baseband processors are to start the BWP switch at slot m+1 when an end of a last symbol of a physical downlink control channel (PDCCH) carrying the active BWP switch downlink control information (DCI) in the DL is aligned with a boundary between slot m and slot m+1. Example seven can include the subject matter of example four or any of the examples described herein, wherein the one or more baseband processors are to start the BWP switch at UL slot m, where m is the beginning of a subframe (FR1) or a half-subframe (FR2) immediately after a BWP-inactivity timer expires on the serving cell for a timer-based BWP switch in the UL.

In example eight, an apparatus of a user equipment comprises one or more baseband processors to process a bandwidth part (BWP) switching request from a serving cell at slot n, and to perform an active BWP switch to a new BWP on the serving cell at a time no later than slot n+Y, wherein Y is a BWP switching delay, wherein the one or more baseband processors are to accommodate a timing advance (TA) value to determine when to perform the active BWP switch, and to start the BWP switch at slot n for the downlink (DL), and a memory to store the BWP switching request. Example nine can include the subject matter of example eight or any of the examples described herein, wherein the one or more baseband processors are to receive a downlink physical shared channel (PDSCH) on the new BWP on the serving cell no later than at slot n+Y. Example ten can include the subject matter of example eight or any of the examples described herein, wherein the one or more baseband processors are to transmit a physical uplink shared channel (PUSCH) on the new BWP on the serving cell no later than at slot n+X, where X=Ceil(Y+TA) in slot units, wherein Ceil(•) is a ceiling function.

In example eleven, one or more machine readable media have instructions stored thereon that, when executed by an apparatus of a user equipment (UE), result in processing a bandwidth part (BWP) switching request from a serving cell at slot n, performing an active BWP switch to a new BWP on the serving cell at a time no later than slot n+Y, wherein Y is a BWP switching delay, and accommodating a timing advance (TA) value to determine when to perform the active BWP switch. Example twelve can include the subject matter of example eleven or any of the examples described herein, wherein the instructions, when executed, further result in receiving a physical downlink shared channel (PDSCH) for the downlink (DL) at a slot offset in time by the TA value with respect to the uplink (UL). Example thirteen can include the subject matter of example eleven or any of the examples described herein, wherein the instructions, when executed, further result in transmitting a physical uplink shared channel (PUSCH) for the uplink (UL) at a slot advanced in time by the TA value with respect to the downlink (DL).

In example fourteen, one or more machine readable media have instructions stored thereon that, when executed by apparatus of a user equipment (UE), result in processing a bandwidth part (BWP) switching request from a serving cell at slot m, performing an active BWP switch to transmit a physical uplink shared channel (PUSCH) in the uplink (UL) on a new BWP on the serving cell at a time no later than slot m+Y, wherein Y is a BWP switching delay, wherein downlink slots are offset by a timing advance (TA) value with respect to UL slots, and accommodating the TA value to determine when to perform the active BWP switch. Example fifteen can include the subject matter of example fourteen or any of the examples described herein, wherein an end of a last symbol of a physical downlink control channel (PDCCH) carrying the active BWP switch downlink control information (DCI) in the DL is within slot m. Example sixteen can include the subject matter of example fourteen or any of the examples described herein, wherein the instructions, when executed, further result in starting the BWP switch at slot m+1 when an end of a last symbol of a physical downlink control channel (PDCCH) carrying the active BWP switch downlink control information (DCI) in the DL is aligned with a boundary between slot m and slot m+1. Example seventeen can include the subject matter of example fourteen or any of the examples described herein, wherein the instructions, when executed, further result in starting the BWP switch at UL slot m, where m is the beginning of a subframe (FR1) or a half-subframe (FR2) immediately after a BWP-inactivity timer expires on the serving cell for a timer-based BWP switch in the UL.

In example eighteen, one or more machine readable media have instructions stored thereon that, when executed by apparatus of a user equipment (UE), result in processing a bandwidth part (BWP) switching request from a serving cell at slot n, and to perform an active BWP switch to a new BWP on the serving cell at a time no later than slot n+Y, wherein Y is a BWP switching delay, accommodating a timing advance (TA) value to determine when to perform the active BWP switch, and starting the BWP switch at slot n for the downlink (DL). Example nineteen can include the subject matter of example eighteen or any of the examples described herein, wherein the instructions, when executed, further result in receiving a downlink physical shared channel (PDSCH) on the new BWP on the serving cell no later than slot n+Y. Example twenty can include the subject matter of example eighteen or any of the examples described herein, wherein the instructions, when executed, further result in transmitting a physical uplink shared channel (PUSCH) on the new BWP on the serving cell no later than at slot n+X, where X=Ceil(Y+TA) in slot units, wherein Ceil(•) is a ceiling function.

Although the claimed subject matter has been described with a certain degree of particularity, it should be recognized that elements thereof may be altered by persons skilled in the art without departing from the spirit and/or scope of claimed subject matter. It is believed that the subject matter pertaining to bandwidth part switching delay for uplink transmission and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
   radio frequency circuitry configured to communicate with a serving cell; and
   one or more baseband processors communicatively coupled to the radio frequency circuitry and configured to perform operations comprising:
     processing a bandwidth part (BWP) switching request from the serving cell at slot n;
     performing an active BWP switch to a new BWP on the serving cell at a time no later than slot n+Y, wherein Y is a BWP switching delay, wherein the one or more baseband processors are to accommodate a timing advance (TA) value to determine when to perform the active BWP switch; and
     receiving a physical downlink shared channel (PDSCH) for the downlink (DL) at a slot offset in time by the TA value with respect to the uplink (UL).

2. The apparatus of claim 1, wherein the operations further comprise:
   transmitting a physical uplink shared channel (PUSCH) for the uplink (UL) at a slot advanced in time by the TA value with respect to the downlink (DL).

3. An apparatus of a user equipment (UE), comprising:
   radio frequency circuitry configured to communicate with a serving cell; and
   one or more baseband processors communicatively coupled to the radio frequency circuitry and configured to perform operations comprising:
     processing a bandwidth part (BWP) switching request from the serving cell at slot m;
     performing an active BWP switch to transmit a physical uplink shared channel (PUSCH) in the uplink (UL) on a new BWP on the serving cell at a time no later than slot m+Y, wherein Y is a BWP switching delay, wherein downlink slots are offset by a timing advance (TA) value with respect to UL slots, and the one or more baseband processors are to accommodate the TA value to determine when to perform the active BWP switch; and
     starting the BWP switch at slot m+1 when an end of a last symbol of a physical downlink control channel (PDCCH) carrying the active BWP switch downlink control information (DCI) in the DL is aligned with a boundary between slot m and slot m+1.

4. The apparatus of claim 3, wherein an end of a last symbol of a physical downlink control channel (PDCCH)

carrying the active BWP switch downlink control information (DCI) in the DL is within slot m.

5. The apparatus of claim 3, wherein the operations further comprise:
starting the BWP switch at UL slot m, where m is the beginning of a subframe (FR1) or a half-subframe (FR2) immediately after a BWP-inactivity timer expires on the serving cell for a timer-based BWP switch in the UL.

6. An apparatus of a user equipment, comprising:
radio frequency circuitry configured to communicate with a serving cell; and
one or more baseband processors communicatively coupled to the radio frequency circuitry and configured to perform operations comprising:
processing a bandwidth part (BWP) switching request from the serving cell at slot n;
performing an active BWP switch to a new BWP on the serving cell at a time no later than slot n+Y, wherein Y is a BWP switching delay, wherein the one or more baseband processors are to accommodate a timing advance (TA) value to determine when to perform the active BWP switch, and to start the BWP switch at slot n for the downlink (DL); and
transmitting a physical uplink shared channel (PUSCH) on the new BWP on the serving cell no later than at slot n+X, where X=Ceil(Y+TA) in slot units, wherein Ceil(–) is a ceiling function.

7. The apparatus of claim 6, wherein the operations further comprise:
receiving a downlink physical shared channel (PDSCH) on the new BWP on the serving cell no later than at slot n+Y.

8. One or more non-transitory machine readable media having instructions stored thereon that, when executed by an apparatus of a user equipment (UE), result in:
processing a bandwidth part (BWP) switching request from a serving cell at slot n;
performing an active BWP switch to a new BWP on the serving cell at a time no later than slot n+Y, wherein Y is a BWP switching delay;
accommodating a timing advance (TA) value to determine when to perform the active BWP switch; and
receiving a physical downlink shared channel (PDSCH) for the downlink (DL) at a slot offset in time by the TA value with respect to the uplink (UL).

9. The one or more non-transitory machine readable media of claim 8, wherein the instructions, when executed, further result in transmitting a physical uplink shared channel (PUSCH) for the uplink (UL) at a slot advanced in time by the TA value with respect to the downlink (DL).

10. One or more non-transitory machine readable media having instructions stored thereon that, when executed by apparatus of a user equipment (UE), result in:
processing a bandwidth part (BWP) switching request from a serving cell at slot m;
performing an active BWP switch to transmit a physical uplink shared channel (PUSCH) in the uplink (UL) on a new BWP on the serving cell at a time no later than slot m+Y, wherein Y is a BWP switching delay, wherein downlink slots are offset by a timing advance (TA) value with respect to UL slots;
accommodating the TA value to determine when to perform the active BWP switch; and
starting the BWP switch at slot m+1 when an end of a last symbol of a physical downlink control channel (PDCCH) carrying the active BWP switch downlink control information (DCI) in the DL is aligned with a boundary between slot m and slot m+1.

11. The one or more non-transitory machine readable media of claim 10, wherein an end of a last symbol of a physical downlink control channel (PDCCH) carrying the active BWP switch downlink control information (DCI) in the DL is within slot m.

12. The one or more non-transitory machine readable media of claim 10, wherein the instructions, when executed, further result in starting the BWP switch at UL slot m, where m is the beginning of a subframe (FR1) or a half-subframe (FR2) immediately after a BWP-inactivity timer expires on the serving cell for a timer-based BWP switch in the UL.

13. One or more non-transitory machine readable media having instructions stored thereon that, when executed by apparatus of a user equipment (UE), result in:
processing a bandwidth part (BWP) switching request from a serving cell at slot n, and to perform an active BWP switch to a new BWP on the serving cell at a time no later than slot n+Y, wherein Y is a BWP switching delay;
accommodating a timing advance (TA) value to determine when to perform the active BWP switch;
starting the BWP switch at slot n for the downlink (DL), transmitting a physical uplink shared channel (PUSCH) on the new BWP on the serving cell no later than at slot n+X, where X=Ceil(Y+TA) in slot units, wherein Ceil(–) is a ceiling function.

14. The one or more non-transitory machine readable media of claim 13, wherein the instructions, when executed, further result in receiving a downlink physical shared channel (PDSCH) on the new BWP on the serving cell no later than at slot n+Y.

* * * * *